United States Patent [19]
Goodman

[11] Patent Number: 5,906,226
[45] Date of Patent: May 25, 1999

[54] VERY LIGHTWEIGHT HIGH-PRESSURE COMPACT CLEANING DEVICE FOR MARINE AND OUTDOOR USE

[76] Inventor: Bertram B. Goodman, 124 Lakeshore Dr., Apt. 631, North Palm Beach, Fla. 33408

[21] Appl. No.: 08/613,439

[22] Filed: Mar. 4, 1996

[51] Int. Cl.⁶ .................................................. F16L 11/04
[52] U.S. Cl. .................... 138/109; 137/355.16; 138/118; 239/195; 248/49; 264/230; 264/281; 264/DIG. 40
[58] Field of Search .................................... 138/109, 118, 138/122, 129; 137/355.16; 239/195; 248/49; 29/890.144, 890.14, 237; 264/230, 209.3, 281, 339, DIG. 40

[56] References Cited

U.S. PATENT DOCUMENTS

| | | | |
|---|---|---|---|
| 2,905,194 | 9/1959 | Smith et al. | 264/281 |
| 3,021,871 | 2/1962 | Rodgers | 138/118 |
| 3,245,431 | 4/1966 | Coe | 138/125 |
| 3,288,169 | 11/1966 | Moss | 138/118 |
| 3,487,858 | 1/1970 | Hanback | 138/118 |
| 3,542,078 | 11/1970 | Lykle . | |
| 3,726,443 | 4/1973 | Harris . | |
| 3,791,415 | 2/1974 | Lawless et al. . | |
| 3,826,288 | 7/1974 | Cooper et al. | 138/118 |
| 3,861,424 | 1/1975 | Mizutani et al. . | |
| 3,977,440 | 8/1976 | Phillippi | 138/130 |
| 4,009,734 | 3/1977 | Sullivan | 138/118 |
| 4,092,034 | 5/1978 | Becker | 138/118 |
| 4,163,455 | 8/1979 | Herbert et al. . | |
| 4,204,494 | 5/1980 | Bridwell et al. . | |
| 4,526,090 | 7/1985 | Maier . | |
| 4,619,618 | 10/1986 | Patti . | |
| 5,111,762 | 5/1992 | Frangiamore . | |
| 5,111,849 | 5/1992 | Zeh | 138/118 |
| 5,247,961 | 9/1993 | Micheau et al. . | |
| 5,283,552 | 2/1994 | Sol . | |
| 5,346,290 | 9/1994 | Orcutt | 138/118 |
| 5,443,100 | 8/1995 | Finley . | |

FOREIGN PATENT DOCUMENTS

| | | | |
|---|---|---|---|
| 1134872 | 11/1968 | United Kingdom | 138/118 |

*Primary Examiner*—Stephen F. Gerrity
*Attorney, Agent, or Firm*—John C. Smith

[57] ABSTRACT

A very light weight high pressure coiled retractable hose kit for marine vehicles and outdoor use which uses a helical structure to automatically retract when not used. The helical structure allows the hose to extend substantially the length of a typical fishing boat. A UV and thermal resistant material is used to withstand damage from prolonged exposure to sunlight, heat or cold. The material is also corrosion resistant to withstand damage from salt water. A high pressure rating allows a narrow diameter hose which occupies a small storage area to be attached to a conventional spigot and provide an increase in water velocity when the nozzle is activated. Input and output fittings and a nozzle retention bracket hold the hose structure in a tight helical spring configuration for storage. The light weight allows easy manipulation of the hose kit and provides improved safety by enhancing the ability to move the hose kit from underfoot during periods of intense activity such as when gaffing fish onboard a boat.

13 Claims, 7 Drawing Sheets

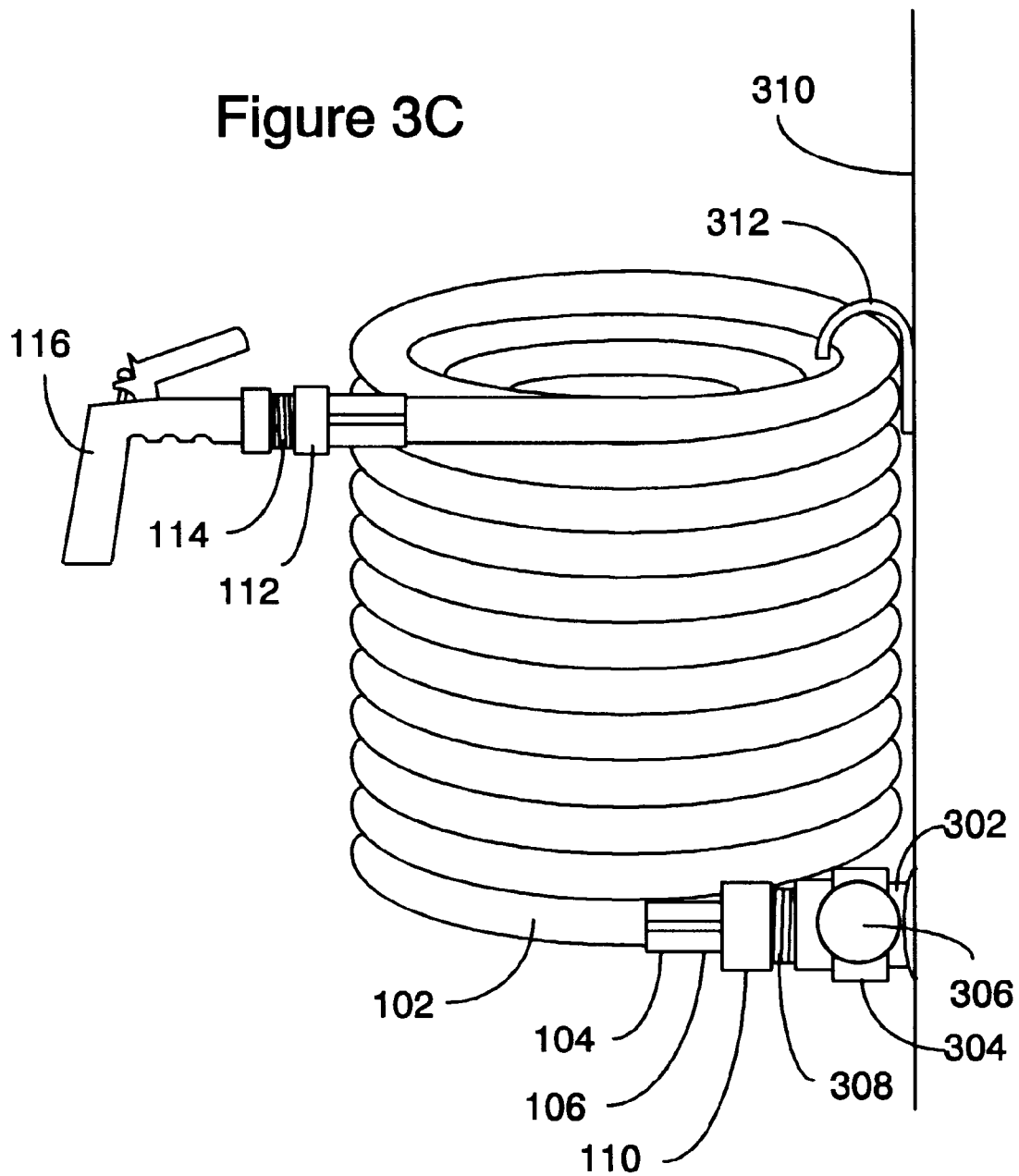

VERY LIGHTWEIGHT HIGH-PRESSURE COMPACT CLEANING DEVICE FOR MARINE AND OUTDOOR USE

BACKGROUND OF THE INVENTION

1. Technical Field

The present invention relates to cleaning devices. In particular, it relates to very lightweight compact retractable hosing kits for use in cleaning outdoor areas, and in particular, for use in cleaning marine vehicles.

2. Background Art

Marine vehicles are difficult to keep in clean condition due to their constant exposure to harsh environmental conditions. Recreational boats, even those used on fresh water require frequent cleaning. Boats used on ocean water require even more maintenance due to the corrosive nature of sea water.

While recreational boats require substantial maintenance, fishing, utility, and cargo boats and ships require even more work due to the nature on materials on board. Fishing boats in particular are exposed not only to water, but also to a variety of debris such as the residue which results from cleaning fish on board.

Boats typically have a fresh water and/or a sea water spigot available which is used in conjunction with an on board pump. When cleaning is required, a standard rubberized hose is attached to allow the boat to be sprayed during the cleaning process. However, conventional hoses take up a substantial amount of space which is a considerable drawback on recreational and fishing boats where space is at a premium. After the cleaning process is complete, storage of a conventional hose is a problem. On many boats this results in the hose being stored ashore and taken on board infrequently which in turn results in less frequent cleaning of the boat.

Even if the hose is kept on board, time and effort is required to fold, roll or otherwise shape the hose for storage. Conventional hose assemblies which retract hoses for storage typically require large and heavy wheel-type racks that are expensive and require substantial storage space to be sacrificed.

Even if a boat does has adequate room to store a hose, there are additional problems associated with keeping the hose on board due to the corrosive nature of a boat's environment. This is particularly true with ocean going vessels. Exposure of conventional hoses to sea water on an ongoing basis will rapidly accelerate the normal deterioration process of the rubberized materials used to fabricate conventional hoses. As a result, the boat owner will be required to bear the expense of more frequent hose replacements.

Water, either fresh water or sea water, is not the only environmental problem. Hoses used on boats and in other outdoor environments are exposed to constant sunlight. The solar radiation which the hose is exposed to will also accelerate the deterioration process and result in more rapid hose failure. Of course, sun light (Ultraviolet, etc) damage effects hoses whether they are used in wet or dry environments. Hoses used on boats are exposed to both types of damage and are therefore prone to more rapid failure.

In addition to solar radiation and water damage, outdoor hoses are prone to thermal damage from extremes of heat or cold which result from their being stored outdoors. Daytime heat accelerates drying and cracking of hoses. Likewise, cold or freezing air will accelerate cracking and damage to hoses.

In addition to the deterioration caused by direct sunlight on the hose wall structure, the mere presence of water in a hose when the hose is not being used may cause hose failure. The reason residual water causes hose failure is that a boat hose is typically left exposed to the sun resulting in rapid heating of the hose and its contents. The result of heating the water trapped inside the hose is that internal hose pressure increases to the point where the hose wall fails, and may even burst, resulting in the expense of having to replace the hose. Typical water hoses do not have the pressure strength for long term use in exposed environments such as boat decks. It would be desirable to have a hose structure capable of withstanding the high pressures which result from the foregoing type of outdoor use.

The weight of conventional hoses creates other problems, particularly when they are used on boats. Rubberized hoses are heavy and tend to be awkward and inconvenient to handle on a boat which rocking in the water. It would be advantageous to have a lightweight hose structure which would be easy to carry and not effect the user's balance when the boat is moving.

More important than the inconvenience to the boater relating to the burden of carrying and manipulating heavy hose structures, heavy conventional hoses create safety problems due to the nature of the activity on many boats. For example, when a fisherman is gaffing a fish there is a great deal of activity on board the boat. The fisherman is handling the fish and simultaneously taking care of lines and equipment. Due to the amount of blood and other parts of the fish which may be inadvertently spilled on the floor of the boat, many fisherman would like to have the ability to conveniently clean the work area on the boat. However, when a heavy conventional hose is left on the deck, it becomes a safety hazard. A fisherman can easily trip on the hose, injuring the fisherman or others.

In addition to the substantial weight of a conventional hose, the weight of the water within it increases the total weight the fisherman must handle. Due to the large diameter of conventional hoses, the total weight is heavier than need be. It would be desirable to have a lightweight hose structure which would present a reduced risk of injury to the fisherman.

The prior art has failed to provide lightweight hose structures useful for cleaning boats and useful for other outdoor cleaning activities which can withstand environmental damage from water (both fresh and sea water), and withstand radiation and heat damage from sunlight and thermal damage from cold weather, and can be easily retracted and conveniently stored in a small storage area.

SUMMARY OF THE INVENTION

The present invention solves the foregoing problems by providing a very lightweight coiled retractable hose kit for marine vehicles and outdoor use which uses a narrow diameter helical structure to minimize total weight and to automatically retract when not used. The helical structure allows the hose to extend substantially the length of a typical fishing boat. The material is corrosion resistant to withstand damage from fresh or salt water. The tube structure used for the hose portion of the kit is also made from a UV resistant material designed to withstand damage from prolonged exposure to sunlight. A high pressure rating allows a narrow diameter hose which occupies a small storage area to be attached to a conventional spigot. The narrow internal diameter of the hose provides an increase in water velocity when the nozzle is activated. Input and output fittings and a nozzle retention bracket hold the hose structure in a tight helical spring configuration for storage. In addition, the narrow diameter reduces the overall weight of the hose structure for a given length of hose and further reduces the total weight of the device when filled with water since the total volume of water for a given length of hose is reduced. The combination of the high pressure rating and reduced diameter also reduce the risk of hose failure since the internal pressure in the hose, when left outdoors in the sun, will not be sufficient to burst the hose.

BRIEF DESCRIPTION OF THE DRAWINGS

FIG. 3C is a side view of the hose kit in the storage position with the proximal end of the hose attached to a conventional spigot and the distal end of the hose attached to a retention bracket and held against a bulkhead wall.

DESCRIPTION OF THE PREFERRED EMBODIMENT

Figure 1:
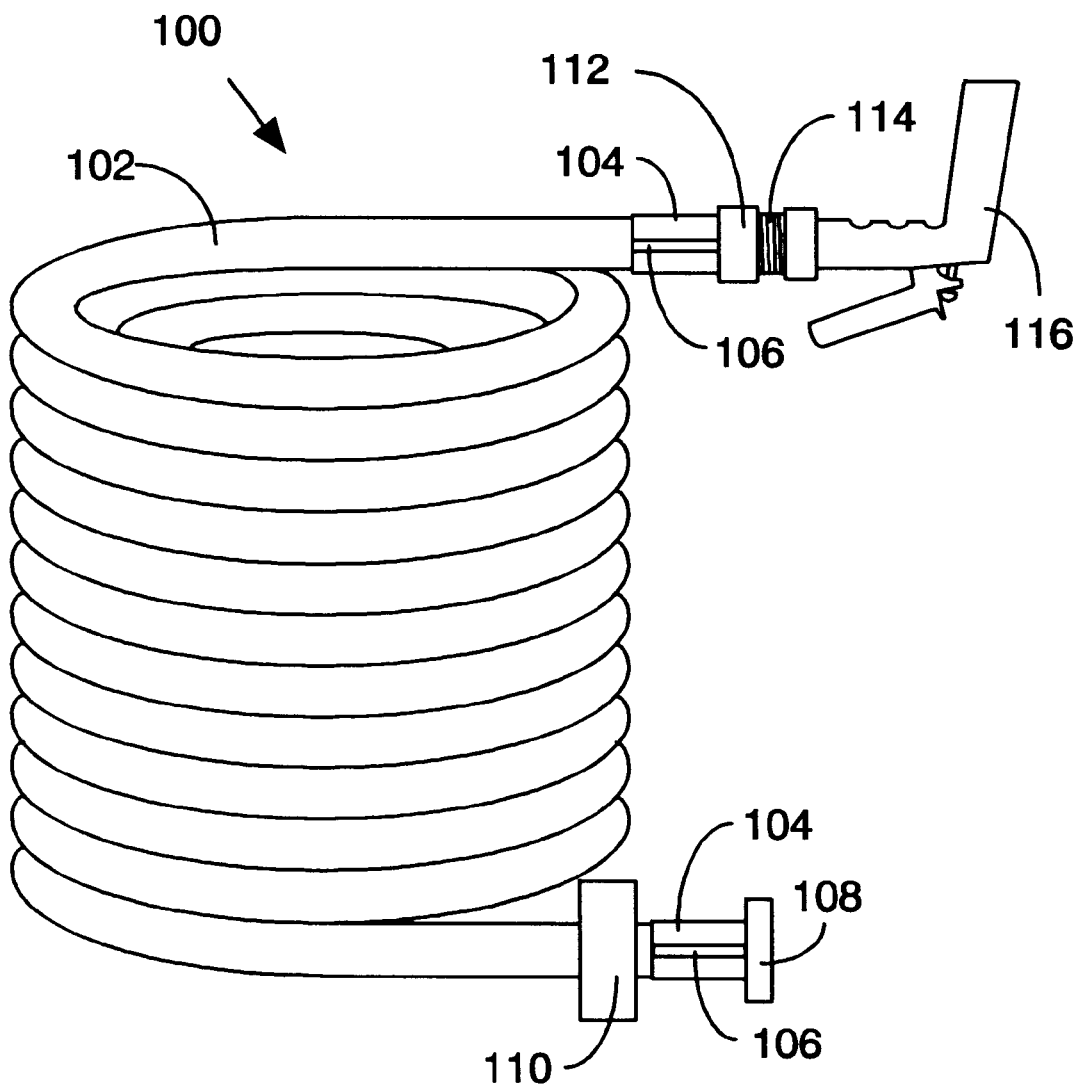
FIG. 1 is a side view illustrating the hose in the coiled position prior to attachment to a spigot.

Prior to a discussion of the figures, a general discussion of the features and advantages of the invention follows. The invention is a very lightweight high pressure hose kit which is easy to carry, easy to manipulate in the extended position, and automatically retracts toward the storage position.

While prior art hose structures are inconvenient to move due to their heavy weight. Therefore, fishermen often leave them laying on the deck where they become a safety hazard. The lightweight structure provided herein (typically under a pound) improves safety by reducing the chance of tripping. This occurs both because the light weight of the hose presents less of a barrier to a fisherman's foot if the fisherman inadvertently steps into the hose, and because the light weight of the hose structure presented herein allows the fisherman to conveniently move the hose out of the way.

The device has improved resistance to water damage (both fresh water and sea water) to extend its useful life. The wall of the hosing tube also provides improved resistance to solar and thermal damage, thereby providing an additional method of extending the useful life of the product and reducing overall cost to the boat owner.

Another principle feature of the invention is that its helical structure solves a significant problem associated with storage on all boats, and especially the problem of storage on smaller boats: namely the general lack of storage space for cleaning equipment such as hosing. As a result, boat owners with a minimum amount of storage facilities are able to conveniently store hoses on the boat for cleaning purposes. For example, the preferred embodiment of the helical structure of the hosing kit provided herein allows a hose to occupy a storage space approximately 6.5 inches in diameter by 8.5 inches in length to extend during use to a radius of approximately 25 feet. As a result, this small helical hosing kit provides cleaning capacity for a circle with a diameter of 50 feet, more than required for all but the largest boats. Of course the water jet emitted by the nozzle will extend the actual usable diameter of cleaning capacity.

In addition to the small storage space occupied by the helical hose, the helical hose has the additional advantage of very light weight. For example, the helical hose discussed above, with a radius of 25 feet, weighs approximately 0.4 KG (less than 1 pound). As compared to prior art hose structures, this amounts to a substantial reduction in weight. Further, the inside diameter of the hose is reduced which results in a further reduction in effective hose weight due to the reduced amount on water trapped within the hose. Further, the reduced amount of water reduces the amount of water available to increase pressure when the hose is heated by the sun.

Those skilled in the art will recognize that while a small helical hose kit provides enough capacity for most boats, the length of the hosing used in the kit can be extended to allow coverage of much larger service areas. Even large vessels, such as ocean going commercial ships can conveniently be serviced by a few strategically placed hose kits.

As discussed above, the physical motion of the boat when in the water makes rolling or folding the hose before and after use awkward. An advantage of the invention is that it is substantially lighter in weight than conventional hoses with no loss of strength. As a result, a user is not burdened by the physical effort required to drag long lengths of conventional hosing when cleaning boats or other outdoor areas.

The hose is resistant to solar radiation such as UV light, etc., as well as to the corrosive effect of prolonged exposure to water. In addition, the other materials used have the same environmental strengths and advantages. As a result, the entire helical hose kit can be left out, exposed to the elements, on an ongoing basis without suffering substantial damage from environmental exposure.

A nozzle retention bracket is provided to support the hose when in the retracted (storage) position.

Referring to FIG. 1, this figure shows the helical hose kit 100 in the coiled position (hereinafter, the retracted position). Hose tube 102 has a semi-rigid helical shape which allows it to occupy the minimum amount of space when not in use. In the preferred embodiment, the hose is made from semi-rigid coiled Nylon tubing. Further each ring of the coil may rest against the adjacent ring when in the rest position. The Nylon tubing has an effective temperature range of −40° F. to +200° F. which will allow it to safely be used in outdoor environments. The preferred embodiment of hose tube 102 has an inside diameter of ⅜ inches and an outside diameter of 0.465 inches. Those skilled in the art will recognize that this dimension can vary. However, an advantage of having a reduced diameter is that it will slightly increase nozzle velocity of water ejected from the hose for a given pressure, thereby providing improved cleaning action. In addition, the smaller the outside diameter of hose tube 102, the smaller the overall size of the helical hose kit when in the retracted position.

An important factor in the preferred material used for hose tube 102 is that the Nylon hose has an operating pressure rating of 200 pounds. Since water is typically pumped at approximately 60 pounds pressure, hose tube 102 is more than able to handle the water pressure. A hose tube 102 requires at least a 60 pound pressure rating to accommodate a typical water supply. Obviously the high strength provided by the Nylon tube meets this requirements and allows use with a wide range of water supply pressures. Further, since the Nylon tubing has such great strength, it allows a smaller diameter tubing to be used which in turn provides a much reduced overall size and weight, as well as reduced storage requirements. In the preferred embodiment, commercially high pressure pneumatic tubing, such as that used on trailer/tractor braking systems has been found to be suitable for fabricating high pressure hose tube 102.

Nylon is also superior to conventional hosing material in its resistance to damage for solar radiation and from fresh and salt water. Sea water in particular is very corrosive to rubberized hoses and results in their premature failure when continuously used in ocean environments. Nylon tubing of this type is commercially available for industrial use.

The proximal end of hose tube 102 is secured to proximal fitting 108 via an inner gripping sleeve 202 (shown in FIG. 2, below) and a compressible mounting sleeve 104. Crimp line 106 is shown, illustrating the compression of mounting sleeve 104. A female swivel nut 110 is shown slidably mounted on hose tube 102.

In the preferred embodiment, mounting sleeve 104 is made from a corrosion resistant metal such as brass. However, any suitable material can be used. Likewise, any suitable material, such as Nylon, polyethylene, polypropylene, etc., can be used to fabricate proximal fitting 108, swivel nut 110, etc.

The distal end of hose tube 102 has a threaded male adapter 112 which includes nozzle threads 114. Male adapter 112 is secured to hose tube 102 with a mounting sleeve 104 that is identical to the mounting sleeve 104 used on the proximal end of the device. A conventional nozzle 116 is shown threaded onto nozzle threads 114.

As can be seen, the retracted position allows an extended length of hose tube 102 to be stored in a minimum volume of space. In addition, the semi-rigid structure of the Nylon tube used to form hose tube 102 retracts to this helical storage position when the hose is released. As a result, the device is easy to extend both to and from the retracted position.

Figure 2A:
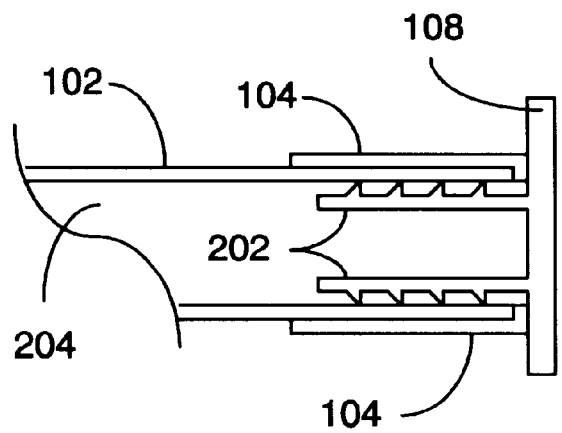
FIG. 2A is a cross sectional view of the proximal end of the hose with a compressible mounting sleeve mounted on the outside of the hose and an inner gripping sleeve of a proximal fitting inserted into the hose prior to compression of the outer mounting sleeve.

In FIG. 2A, a cross sectional view of the proximal end of helical hose kit 100 is shown. Proximal fitting 108 has an inner gripping sleeve 202 which extends into hose tube 102. Compressible mounting sleeve 104 is slidably mounted over hose tube 102 prior to inserting inner gripping sleeve 202. Channel 204 provides a fluid path through hose tube 102. This figure illustrates the device after the inner gripping sleeve 202 and mounting sleeve 104 have been attached to hose tube 102, but before they have been secured in place.

Figure 2B:
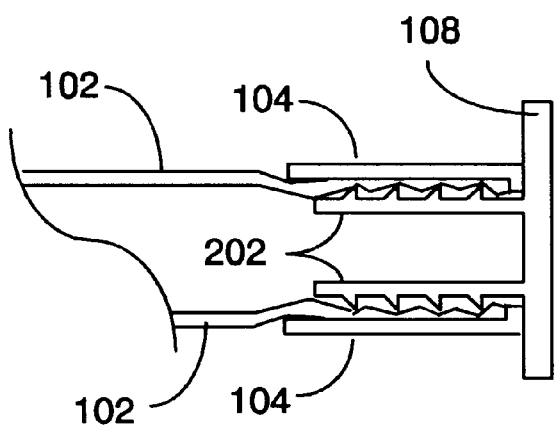
FIG. 2B is a cross sectional view of the proximal end of the hose with a compressible mounting sleeve mounted on the outside of the hose and an inner gripping sleeve inserted into the hose after compression of the outer mounting sleeve has secured the inner gripping sleeve to the hose.

In FIG. 2B, a cross sectional view of the proximal end of helical hose kit 100 is shown after inner gripping sleeve 202 and mounting sleeve 104 have been secured to hose tube 102. Mounting sleeve 104 is compressed onto hose tube 102. In turn, hose tube 102 is compressed into the gripping teeth of inner gripping sleeve 202. As a result, proximal fitting 108 is securely attached to hose tube 102. A result of the compression is the creation of crimp lines 106 (shown in FIG. 1) in mounting sleeve 104.

Figure 2C:
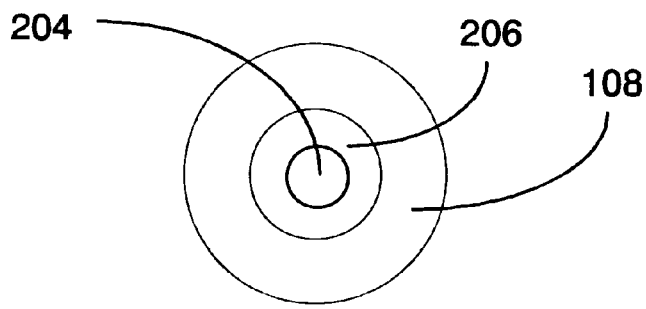
FIG. 2C is an end view of the proximal end of the hose which illustrates the narrow diameter of the water conduit used by the hose.

In FIG. 2C, a proximal end view of proximal fitting 108 after installation of proximal fitting 108 onto hose tube 102. A recessed area 206 is shown extending from the proximal surface of proximal fitting 108 toward channel 204.

Figure 3A:
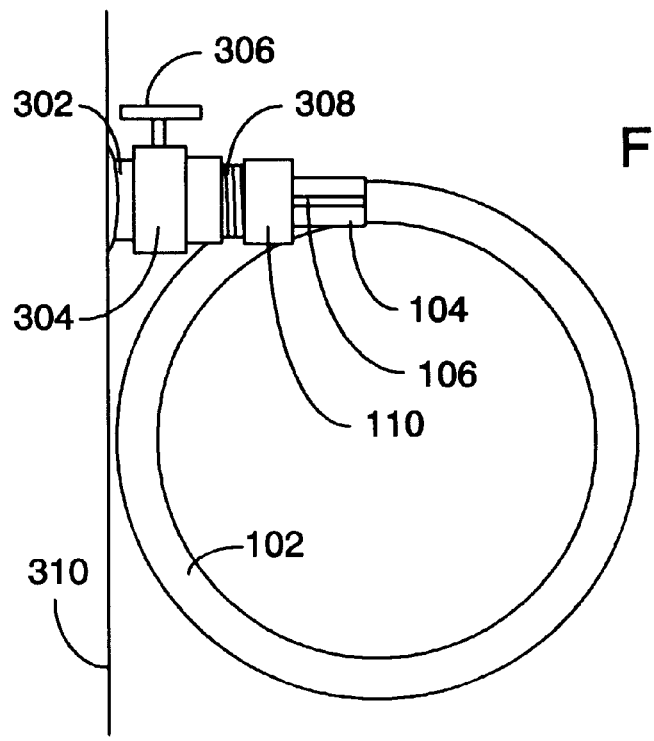
FIG. 3A is a proximal end view of the hose kit with the hose attached to a conventional spigot.

FIG. 3A illustrates the proximal end of the helical hose kit 100 threaded onto a conventional spigot 304 via spigot threads 308. Spigot 304 receives water through pipe 302 and is controlled by valve 306. The helical hose kit 100 is shown resting against the surface of bulkhead 310 in the retracted state.

Figure 3B:
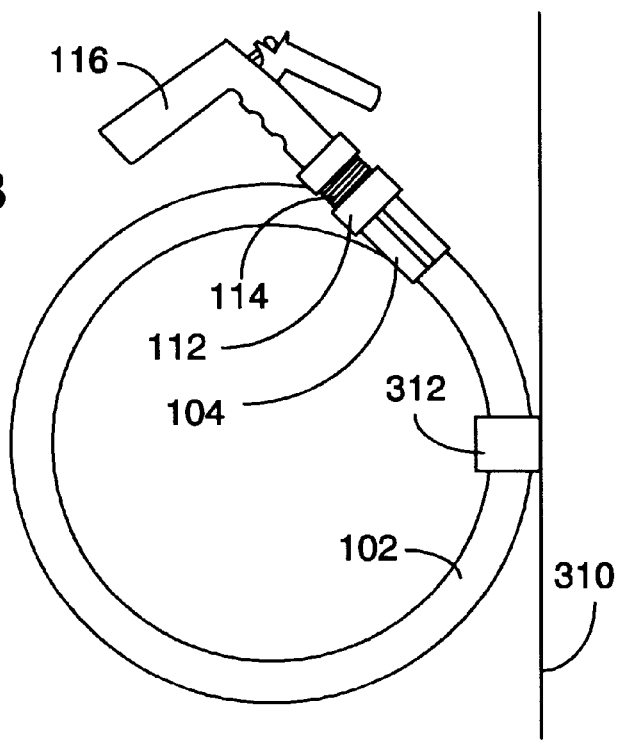
FIG. 3B is a distal end view of the hose kit with the distal end of the hose attached to a retention bracket.

FIG. 3B illustrates the distal end of the helical hose kit 100 with a conventional nozzle 116 threaded onto nozzle threads 114. Also shown is optional retention bracket 312 which is holding the proximal end of helical hose kit 100 against bulkhead 310. Retention bracket 312 secures helical hose kit 100 in the retracted position and prevents movement due to the movement of the boat 402. As was the case in FIG. 3A, the helical hose kit 100 is shown resting against the surface of bulkhead 310 in the retracted state.

FIG. 3C illustrates a side view of helical hose kit 100 in the retracted position. Optional retention bracket 312 is shown wrapped around one of the coils of hose tube 102. Retention bracket 312 is secured to bulkhead 310 via conventional screws (not shown). Those skilled in the art will recognize that variations can be made in how retention bracket 312 is implemented and any suitable attachment method may be used. For example, if helical hose kit 100 is mounted on the hull of boat 402, then of course it would be more desirable to use adhesive instead of screws. Likewise, retention bracket 312 can have a variety of configurations so long as it is capable of grasping hose tube 102.

Figure 4A:
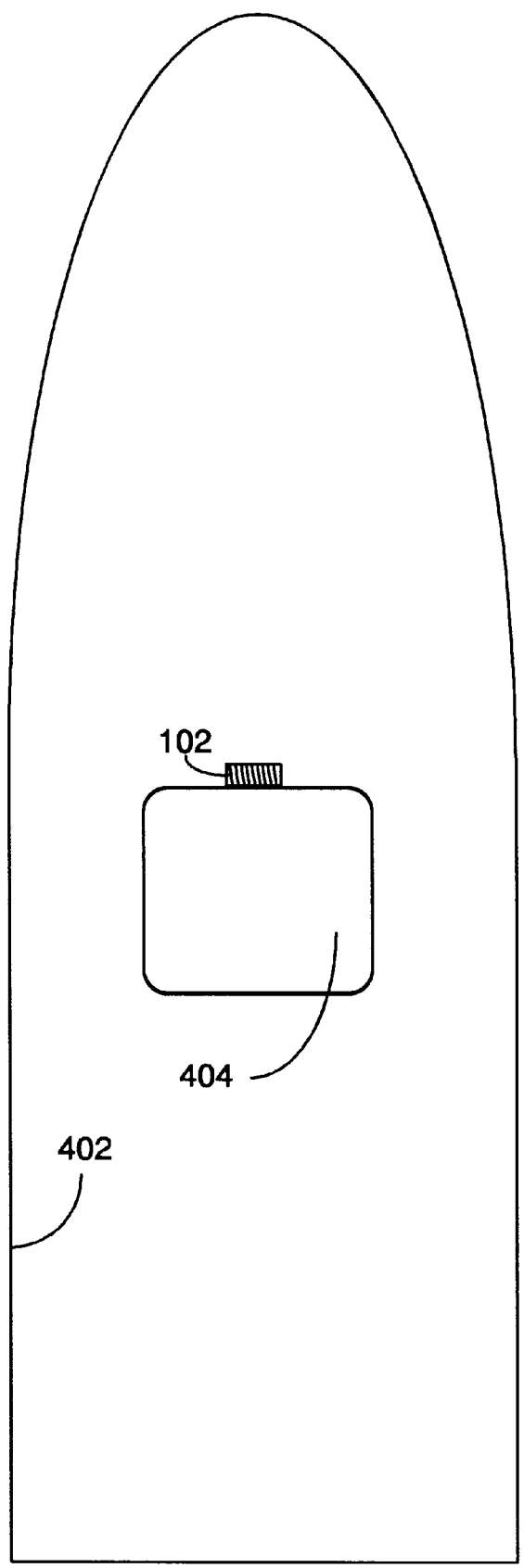
FIG. 4A is a top plan view of a fishing boat with the hose kit mounted on the steering console of a fishing boat in the storage configuration.

FIG. 4A is a top plan view of helical hose kit 100 mounted on the central console 404 of a conventional fishing boat 402. The actual location of helical hose kit 100 is not important so long as it is conveniently mounted near a spigot 304. As can be seen, the small dimensions of helical hose kit 100 when in the retracted position provide the boat owner with the ability to conveniently store a cleaning hose which is out of the way when not in use, and readily available when needed. Further, the materials used to fabricate helical hose kit 100 allow it to be continuously exposed to the elements without premature failure.

For ease of illustration, helical hose kit 100 is shown mounted in an exposed position on an outside bulkhead. Those skilled in the art will recognize that due to the small overall size of the invention when in the retracted state, it would be easy to provide a closed compartment which would conceal helical hose kit 100 for cosmetic reasons.

Figure 4B:
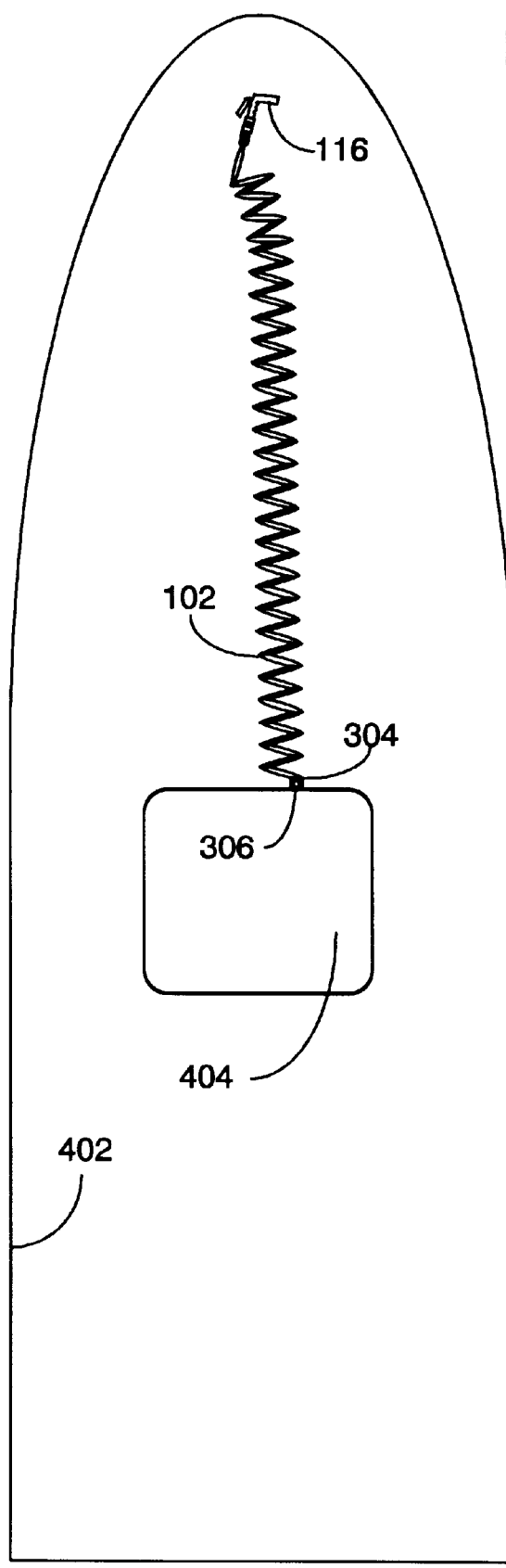
FIG. 4B is a top plan view of a fishing boat with the hose kit mounted on the steering console of a fishing boat with the hose extended towards the bow.

FIG. 4B is a top plan view of helical hose kit 100 mounted on the central console 404 of a conventional fishing boat 402 and in the extended position. This figure illustrates a principle advantage of the invention in that while a minimal amount of space is required for storage, the extended length of hose tube 102 allows the boat owner to clean the entire boat 402. Those skilled in the art will recognize that the number of rings in the hose tube 102 will vary based on the length of the hose structure. In the preferred embodiment, a hose tube 102 occupying a storage space less than 1 foot in length with an extended length of 25 feet would typically have approximately 17 rings. As can be seen, the helical structure provided in the prefered embodiment provides an extended to retracted ratio of at least 25 to 1. This results in significant storage advantages for the boat owner. Of course, the dimensions of the ring and the tube 102 will cause the ratio to vary.

Figure 4C:
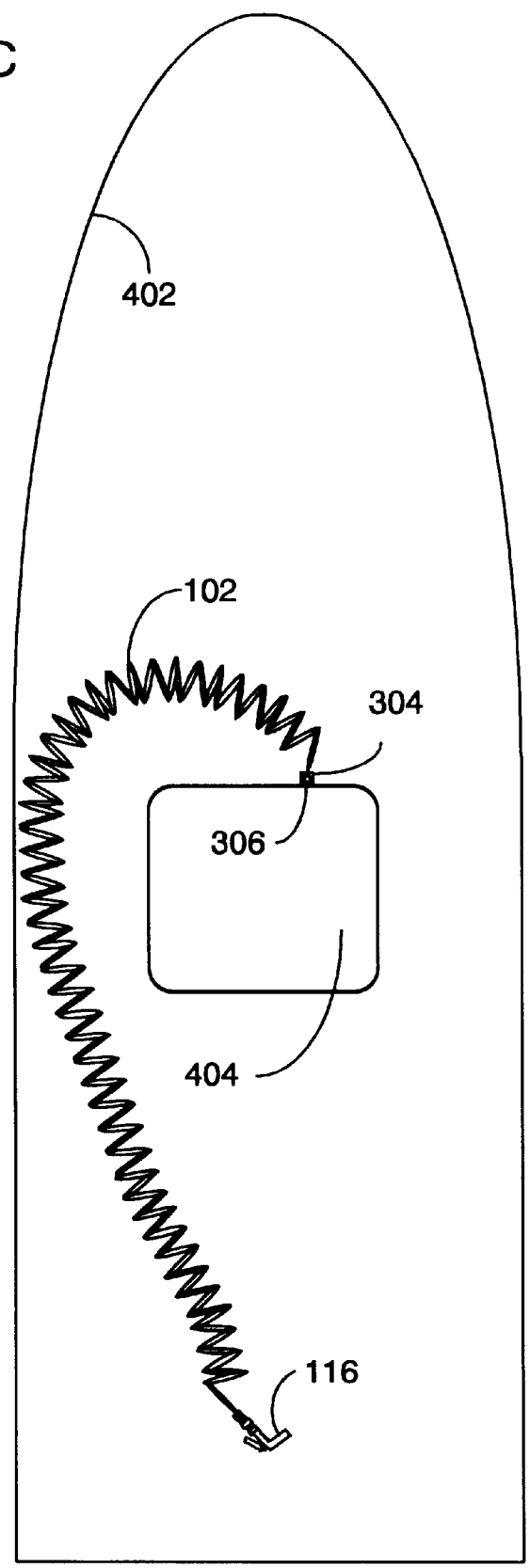
FIG. 4C is a top plan view of a fishing boat with the hose kit mounted on the steering console of a fishing boat with the hose extended towards the stern.

FIG. 4C is a top plan view of helical hose kit 100 mounted on the central console 404 of a conventional fishing boat 402 and in the extended position. In this figure, the helical hose kit 100 is extended toward the stern end of the boat. As a result of the flexibility of the nylon tubing used for hose tube 102, it can be flexed to allow the entire boat 402 to be cleaned with a single helical hose kit 100.

While Nylon is used in the preferred embodiment, any suitable material can be substituted which has suitable strength, temperature, corrosion, and flexibility characteristics. Likewise, the components used on the proximal and distal ends of the device can be fabricated from any material with suitable characteristics. Mounting techniques can vary. For example, proximal fitting 108 may be heat sealed to hose tube 102.

In the preferred embodiment, fittings made from virgin nylon has been found to provide the highest effective pressure rating. For example a proximal fitting 108 fabricated from virgin Nylon would have a pressure rating of approximately 150 PSI. When used in combination with a lightweight helical Nylon hose having a typical pressure rating of 200 PSI, the resulting structure has an overall pressure capacity of 150 PSI which is more than adequate for the 60 PSI from the spigot 304 or from pressure created from sunlight heating residual water in hose tube 102. Of course, if the diameter of the wall of hose tube 102 was reduced such that it had a 150 PSI rating, when used in combination with a 150 PSI rated fitting, it would still provide an overall structure with a rating of 150 PSI. However, since the walls of hose tube 102 would occupy less space at this rating, the retracted size would be less and the extended to retracted ratio would be greater.

The flexibility of virgin Nylon fittings allows both the use of a standard washer when attaching the helical hose kit 100 to a spigot 304, or alternatively the removal of the washer when the threading available for attachment to the spigot is inadequate.

In addition to use on boat decks, the invention is equally well suited for use in the boats cockpit, or in the engine room of larger boats. In fact, a larger boat would preferably have at least one helical hose kit 100 in the engine room and at least one other helical hose kit 100 for other areas of the boat.

The helical hose kit 100 is particularly useful in a harsh marine environment, as described above. However, it is also useful in outdoor land environments. For example, it provides an easy method of cleaning up around outdoor barbeques, for filling or cleaning around swimming pools, for use in garages, etc. In addition, it is also useful for indoor areas, such as kitchens, where an inexpensive and conveniently stored hose would be occasionally useful. Of course, the safety and convenience features of the lightweight hose structure apply to non-boat uses as well.

While the invention has been described with respect to a preferred embodiment thereof, it will be understood by those skilled in the art that various changes in detail my be made therein without departing from the spirit, scope, and teaching of the invention. For example, the material used may be anything suitable for the purposes of the invention, the length may vary, etc. Accordingly, the invention herein disclosed is to be limited only as specified in the following claims.

I claim:

1. A lightweight high-pressure helical hose kit, comprising:
   a flexible substantially helical tube having a distal end and a proximal end, further comprising:
      a high pressure wall having a narrow diameter channel and a minimum pressure rating of approximately 60 PSI;
      the helical tube has a retracted position in which it flexes to individual helical rings which rest substantially adjacent one another and an extended position in which the helical rings are extended such that the helical tube has an extended reach; and
      the helical tube flexes toward the retracted position when released;
   a first high pressure fitting attached to the distal end of the helical tube and a second high pressure fitting attached to the proximal end of the helical tube, the first and second high pressure fittings fabricated from virgin Nylon;
   fitting attachment means to attach the first high pressure fitting to the distal end of the helical tube and the second high pressure fitting to the proximal end of the helical tube; and
   the first and second high pressure fittings have a minimum pressure rating of approximately 150 PSI
   whereby, the lightweight high-pressure helical hose kit can be stored in a small storage area when in the retracted position and the distal end can extend a substantial distance from the proximal end when in the extended position.

2. A lightweight high-pressure helical hose kit, as in claim 1, further comprising a retention bracket, the retention bracket having means to be secured against a support surface and further having means to releasably secure the distal end of the helical tube when in the retracted position.

3. A lightweight high-pressure helical hose kit, comprising:
   a flexible substantially helical tube having a distal end and a proximal end, further comprising:
      a high pressure wall having a narrow diameter channel and a minimum pressure rating of approximately 150 PSI;
      the helical tube has a retracted position in which it flexes to individual helical rings which rest substantially adjacent one another and an extended position in which the helical rings are extended such that the helical tube has an extended reach; and
      the helical tube flexes toward the retracted position when released;
   a first high pressure fitting attached to the distal end of the helical tube and a second high pressure fitting attached to the proximal end of the helical tube:
   fitting attachment means to attach the first high pressure fitting to the distal end of the helical tube and the second high pressure fitting to the proximal end of the helical tube; and
   the first and second high pressure fittings have a minimum pressure rating of approximately 150 PSI, and are fabricated from virgin Nylon;
   whereby the lightweight high-pressure helical hose kit can be stored in a small storage area when in the retracted position and the distal end can extend a substantial distance from the proximal end when in the extended position.

4. A lightweight high-pressure helical hose kit, as in claim 3, wherein the helical tube is fabricated from Nylon.

5. A lightweight high-pressure helical hose kit, as in claim 4, wherein the helical tube has a minimum extended to retracted ratio of approximately 25:1.

6. A lightweight high-pressure helical hose kit, as in claim 5, wherein the fitting attachment means further comprises:
   an first inner gripping sleeve extending from the first high pressure fitting into the internal channel of the helical tube and a second inner gripping sleeve extending from the second high pressure fitting into the internal channel of the helical tube;
   a first compressible mounting sleeve mounted over the distal end of the helical tube and a second compressible mounting sleeve mounted over the proximal end of the helical tube, the first and second compressible mounting sleeves compressed against the outer wall of the helical tube such that the inner wall of the helical tube is compressed against the inner gripping sleeve.

7. A lightweight high-pressure helical hose kit, as in claim 6, further comprising a retention bracket, the retention bracket having means to be secured against a support surface and further having means to releasably secure the distal end of the helical tube when in the retracted position.

8. A lightweight high-pressure helical hose kit, comprising:
   a flexible substantially helical tube having a distal end and a proximal end, further comprising:
      a high pressure wall having a narrow diameter channel and a minimum pressure rating of approximately 200 PSI;
      the helical tube has a retracted position in which it flexes to individual helical rings which rest substantially adjacent one another and an extended position in which the helical rings are extended such that the helical tube has an extended reach;
      the helical tube flexes toward the retracted position when released: and
      the helical tube has a minimum extended to retracted ratio of approximately 25:1;
   a first high pressure fitting attached to the distal end of the helical tube and a second high pressure fitting attached to the proximal end of the helical tube;
   fitting attachment means to attach the first high pressure fitting to the distal end of the helical tube and the second high pressure fitting to the proximal end of the helical tube; and
   the first and second high pressure fittings have a minimum pressure rating of approximately 150 PSI;
   whereby, the lightweight high-pressure helical hose kit can be stored in a small storage area when in the retracted position and the distal end can extend a substantial distance from the proximal end when in the extended position.

9. A lightweight high-pressure helical hose kit, as in claim 8, wherein the first and second high pressure fittings are fabricated from virgin Nylon.

10. A lightweight high-pressure helical hose kit, as in claim 9, wherein the fitting attachment means further comprises:
    an first inner gripping sleeve extending from the first high pressure fitting into the internal channel of the helical tube and a second inner gripping sleeve extending from the second high pressure fitting into the internal channel of the helical tube;
    a first compressible mounting sleeve mounted over the distal end of the helical tube and a second compressible mounting sleeve mounted over the proximal end of the helical tube, the first and second compressible mounting sleeves compressed against the outer wall of the helical tube such that the inner wall of the helical tube is compressed against the inner gripping sleeve.

11. A lightweight high-pressure helical hose kit, as in claim 10, further comprising a retention bracket, the retention bracket having means to be secured against a support surface and further having means to releasably secure the distal end of the helical tube when in the retracted position.

12. A method of fabricating a lightweight self retracting high-pressure helical hose kit, including the steps of:
    using a high pressure pneumatic tube having a pressure rating of approximately 200 PSI as a conduit for water;
    sizing the inside diameter of the pneumatic tube such that the amount of residual water in the tube is minimized;
    using a helical structure for the pneumatic tube such that the pneumatic tube has a retracted position in which it flexes to individual helical rings which rest substantially adjacent one another and an extended position in which the helical rings are extended such that the pneumatic tube has an extended reach, the pneumatic tube having a minimum extended to retracted length ration of approximately 25:1; and
    attaching a first high pressure fitting to the distal end of the pneumatic tube and a second high pressure fitting attached to the proximal end of the pneumatic tube;
    whereby, the lightweight high-pressure helical hose kit can be stored in a small storage area when in the retracted position and the distal end can extend a substantial distance from the proximal end when in the extended position.

13. A method, as in claim 12, including the further steps of:
    using virgin Nylon having a minimum pressure rating of 150 PSI to fabricate the first and second high pressure fittings;
    using high pressure Nylon tubing to fabricate the pneumatic tube;
    using a retention bracket to secure the distal end of the pneumatic tube when in the retracted position.

* * * * *